United States Patent

[11] 3,625,802

| [72] | Inventor | Jack C. Schniepp<br>Richmond, Va. |
|---|---|---|
| [21] | Appl. No. | 879,768 |
| [22] | Filed | Nov. 25, 1969 |
| [45] | Patented | Dec. 7, 1971 |
| [73] | Assignee | AMP Incorporated |

[54] PACKAGING APPARATUS
4 Claims, 6 Drawing Figs.

[52] U.S. Cl. ................................................ 156/546,
156/251, 156/496, 156/515
[51] Int. Cl. ....................................... B32b 31/08,
B32b 31/20
[50] Field of Search ................................ 156/229,
251, 267, 269, 271, 324, 467, 494–496, 515, 544,
555, 580, 583, 546

[56] References Cited
UNITED STATES PATENTS

| 2,660,218 | 11/1953 | Johnson et al. | 156/515 X |
| 2,767,941 | 10/1956 | Gegner et al. | 156/251 X |
| 3,028,294 | 4/1962 | Histed | 156/515 |
| 3,065,121 | 11/1962 | Andrews | 156/544 X |
| 3,243,487 | 3/1966 | Smith | 156/251 X |
| 3,355,337 | 11/1967 | Zelnick | 156/515 X |

*Primary Examiner*—Benjamin A. Borchelt
*Assistant Examiner*—James M. Hanley
*Attorneys*—George W. Price and Barry H. Fishkin

ABSTRACT: Sealing apparatus which comprises a pair of rollers mounted for receiving a plurality of sheets of thermoplastic film therebetween, means for driving at least one of said rollers to advance said thermoplastic sheets therepast, and means for heating one of said rollers to apply fusing heat to said sheets of thermoplastic film.

INVENTOR.
JACK C. SCHNIEPP
BY
ATTORNEY

PACKAGING APPARATUS

BACKGROUND

This invention relates to the manufacture of plastic packages and more particularly to the heat sealing of plastic packages.

The use of plastics, such as polyethylene, in thin films as a packaging material for edible products and the like has attained widespread consumer acceptance and popularity in the last few years. In response to this popularity, a number of sophisticated packaging machines have been designed utilizing such plastic films as packaging material.

In a common cycle of operation, such a machine advances the article to be packaged through a work station and a film of thermoplastic packaging material drawn from a supply is advanced along therewith above and below the article. The packaging is effected by heat sealing the two thermoplastic films together opposite the four sides of the article.

Effective heat sealing of thermoplastic films involves the controlled application of heat and pressure to the films for predetermined time.

The apparatus generally used heretofore for heat sealing the thermoplastic film in such operations is a hot wire or bar which operates to sever the plastic films from their supply and fuse them together to form the package at the same time.

In general, the hot wire process involves some manner of tensioning the film and then applying the hot wire thereto. However, it has been learned that insufficient pressure is generated by the tension and hot wire to effect a reliable seal at all times.

While steps can be taken to make sealing and severing by a hot wire or bar useful, such steps have proved to be bulky, unwielding and inefficient, particularly for side sealing.

SUMMARY

It is, therefore, an object of this invention to provide improved means for fusing sheets of thermoplastic materials together.

It is still further object of this invention to provide apparatus for joining together two units of thermoplastic materials as they are being advanced through a work station.

It is a yet further object of this invention to provide means for joining thermoplastic materials along a linear path by applying heat and pressure in situ and advancing the thermoplastic materials therepast along a longitudinally extending path.

In accordance with these and other objects, apparatus according to the invention may comprise means for advancing two sheets of thermoplastic material through a work area and means connected to said last named means for applying heat to said sheets of thermoplastic material.

DESCRIPTION OF THE PREFERRED EMBODIMENT

Figure 1:
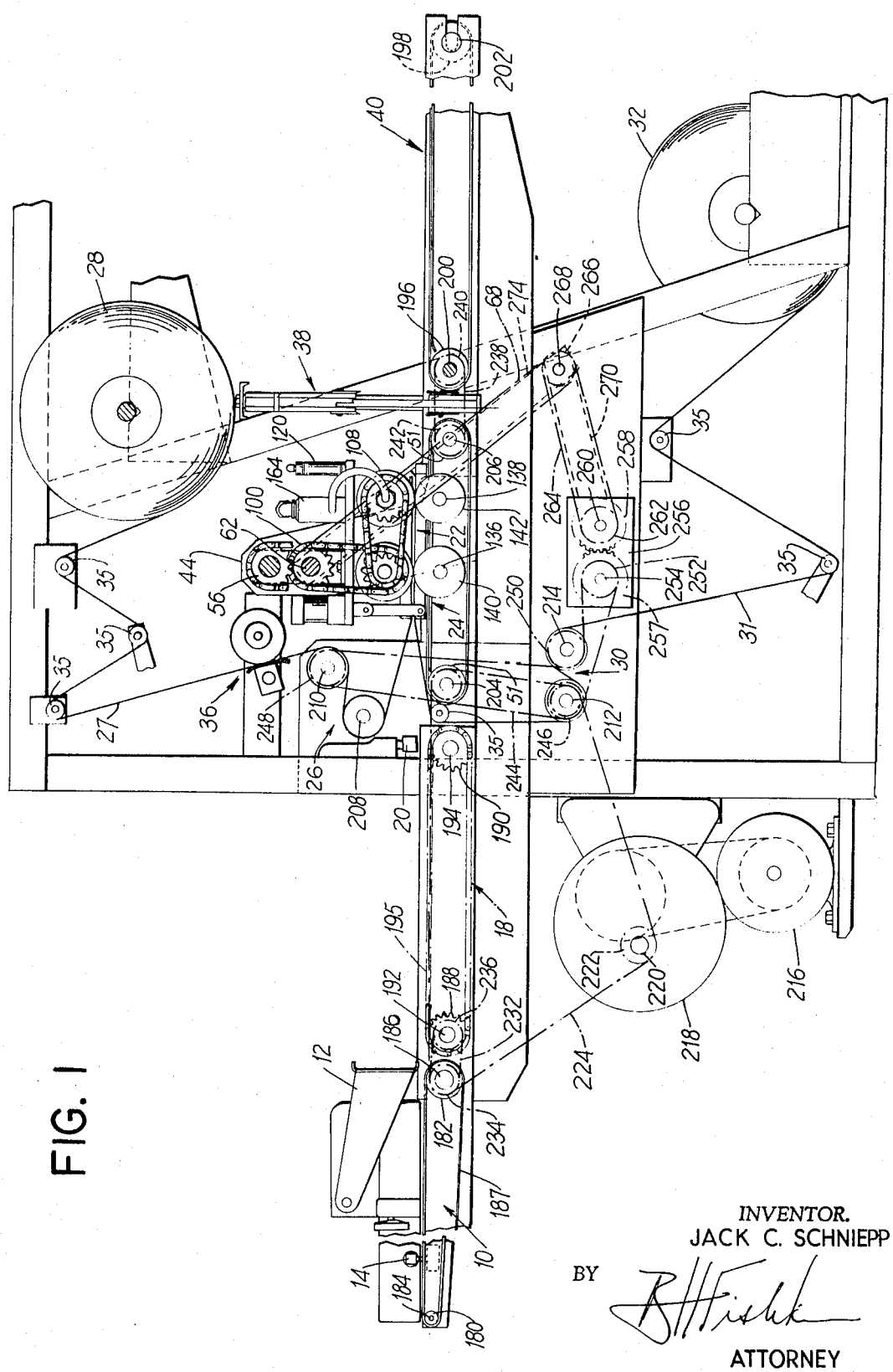
FIG. 1 is a side elevation view of a packaging apparatus incorporating a preferred embodiment of the invention.

The subject invention is described here in conjunction with packaging apparatus schematically disclosed in the Assignee's copending application Ser. No 597,316, now Pat. No 3,503,175 entitled "Bulk Packer" filed Nov. 28, 1966.

Summarizing briefly, in this type of apparatus articles to be packaged are advanced down a first conveyor 10 (the reference numerals in this application do not correspond to those of the Assignee's copending application) to a gate mechanism 12 which opens upon the sensing of predetermined article or group of articles by a sensing device 14. When the gate opens, the articles are fed to a second conveyor 18 which conveys the articles past a second sensing device 20 to a work area 22 that includes a work area conveyor means 24.

A pair of plastic film feed rollers 26 are mounted above work area 22 and are operable to withdraw a sheet or web of plastic film 27 from a supply reel 28 for advancing to the work area 22 above an article to be packaged. In a like manner, a pair of feed rollers 30 are mounted below work area 22 and are operable to withdraw a sheet of plastic film 31 from a supply reel 32 for advancing to the work area between an article to be packaged and the conveyor means 24.

The two plastic films are brought together at the sides thereof and are fed through a guide 34 mounted to each side of the apparatus in a manner discussed in detail hereinbelow.

A plurality of idler rollers 35 are provided in conjunction with the feed rollers ans supply reels to allow for back up in case of jamming. A perforating wheel and anvil 36 are mounted to the apparatus frame to place a longitudinal perforation in the top film 27 for purposes set forth in detail in the aforementioned copending application.

An end sealing and serving subcombination 38 is mounted at the rear of conveyor 24 and is operable to form the front and rear of a package on succeeding cycles in a manner described in detail in the aforementioned copending application. And, an exit conveyor 40 is provided to carry the finished package to a pickup area.

All the conveyors are driven continuously, with the packaging operation being controlled by a clutch and brake mechanism (not shown) operatively connected to the sensing devices 14 and 20, the plastic film feed rollers 26 and 30 and end sealer 38. The cycle is an intermittent one, with the longitudinal drive of the article and film through the work area being inactivated by the clutch and brake during the operation of subcombination 38 as it forms the front and rear of each package and being reactivated if an article is sensed by sensing device 20. Sensing device 14 and gate mechanism 12 assure the proper spacing of articles being advanced along the conveyors 10 and 18, all as described in the aforementioned copending application.

A side sealing and driving subcombination 42, described in detail hereinbelow, is mounted on each side of the work area 22 to both seal the sides of the package being formed and to tension the sheets and drive them through the work area.

Figure 2:
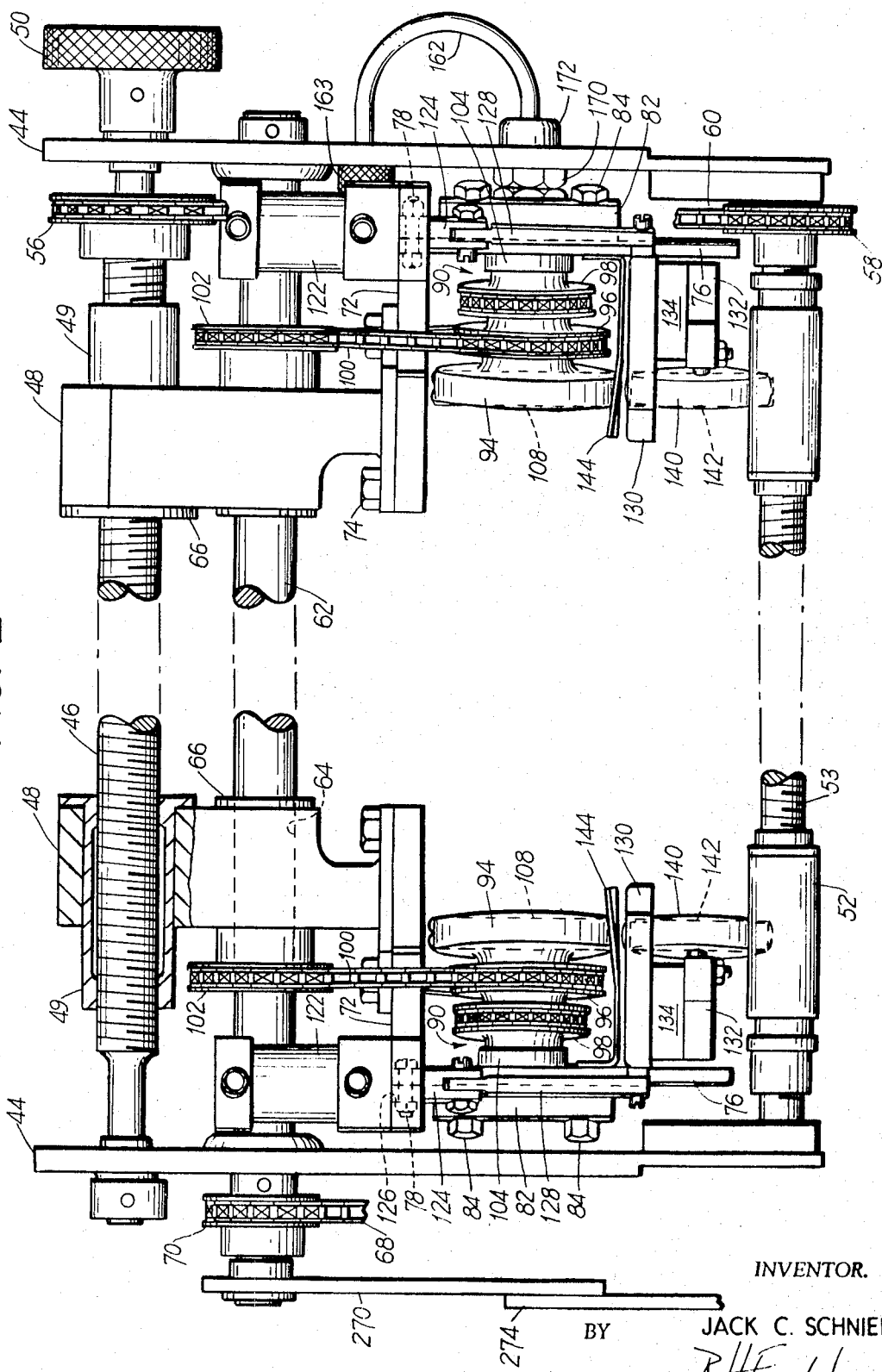
FIG. 2 is a front view of the work area of the apparatus shown in Fig. 1.
Figure 3:
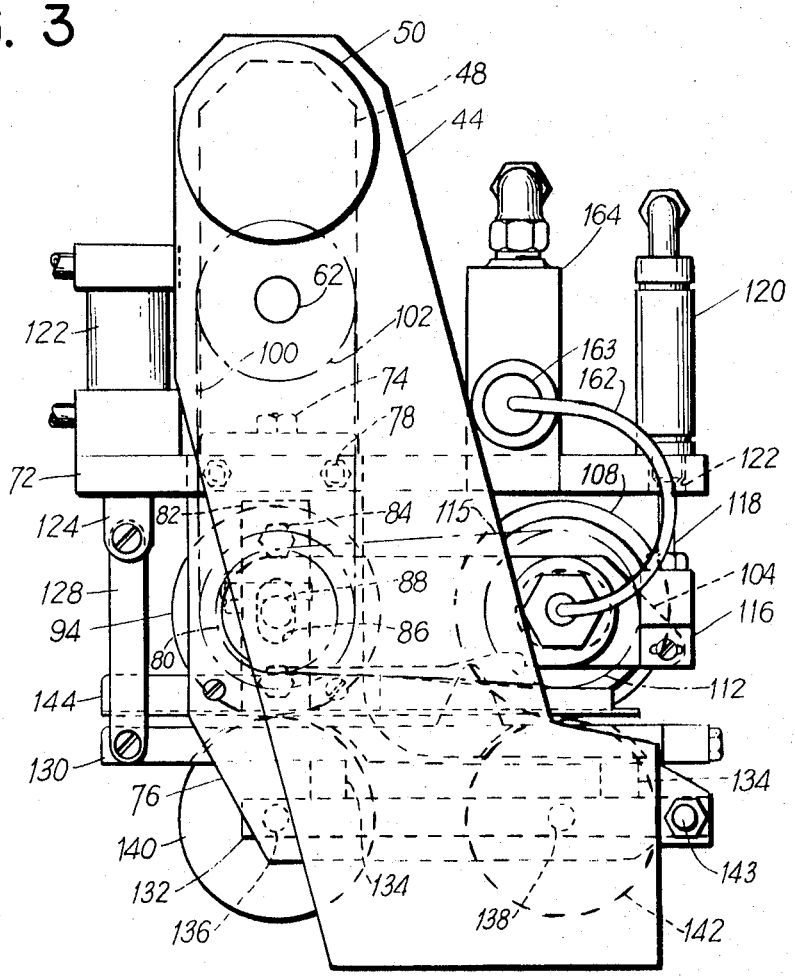
FIG. 3 is an enlarged side elevation view of the apparatus shown in Fig. 2.

Referring now in particular to FIG. 2, a vertically extending plate 44 is mounted to the machine frame on each side thereof. A threaded rod 46 is rotatably mounted between the side plates 44 and has a right-hand thread on the left-hand side thereof and a left-hand thread on the right side thereof. A sleeve member 48 is mounted on each side of the threaded rod 46 by a fitting 49 and a side sealing and driving combination 42 is mounted to each sleeve member. The opposite pitches of the thread on the rod provide that when the rod is rotated, as by a handle 50, the sleeve members 48 will either converge or diverge to adjust the side sealers for different package widths.

The work area conveyor means 24 is also adjustable for different package widths. The conveyor means comprises three belts (not shown) mounted side by side between spaced rollers 51. The spacing between the outside two belts is adjusted by a pair of spindles 52 mounted on a threaded rod 53 for engaging the outside two belts. The threaded rod 53 is mounted in sideplates 44 in spaced relationship with threaded rod 46 and is threaded in a like manner therewith. The spindles 52 move in conjunction with the sleeve members 48 upon rotation of handle 50 since threaded rod 53 is rotated along therewith by a sprocket 56 mounted on threaded rod 46, a sprocket 58 mounted on threaded rod 53 and chain 50 mounted over sprockets 56 and 58. Thus, conveyor means 24 is adjusted in width along with the spacing of the side sealers.

A shaft 62 is rotatably mounted between sideplates 44 below threaded rod 46. The shaft passes through apertures 64 provided in the sleeve members 48 for this purpose, with bushings 66 being provided in the apertures to reduce friction. The shaft 62 is driven by a chain 68 from the machine drive acting on a sprocket 70 mounted on the shaft to the outside of the left-hand sideplate 44.

With reference to Figs. 2–6, a side-sealing subcombination 42 according to the invention is mounted to each sleeve member 48 by a support plate 72 connected thereto by bolts 74. The support plate is connected to each sleeve member at a slight angle, such that the side-sealing combinations diverge from each other for purposes set forth hereinbelow. An L-shaped member 76 is secured at the top thereof to the support plate 72 by bolts 78. A forward upper roller shaft 80 is mounted in L-shaped member 76 by a bracket 82 bolted to the member by bolts 84. Bracket 82 has a slot 86 therein and a screw 88 adjustably fixes shaft 80 therein for a variable vertical position to adjust the forward idlers for different thermoplastic film widths. A collar 90 is rotatably mounted on shaft 80 by a sleeve bearing 92 and includes a forward upper roller 94 and a pair of sprockets 96 and 98.

The collar 90 is rotated by a chain 100 mounted over sprocket 96 and a sprocket 102 mounted in spaced relationship therewith on shaft 62.

A connecting arm 104 is pivotally mounted at one end thereof on shaft 80 and a rear upper roller shaft 106 is mounted therein at the other end thereof. A rear upper roller 108 is rotatably mounted on shaft 106 by bearings 110 and roller 108 is rotated by a sprocket 112 secured thereto by screws 114 and a chain 115 mounted over sprocket 112 and over sprocket 98 on forward roller shaft 80.

The back of connecting arm 104 is connected to a mounting bracket 116 by a bolt 117 which is connected to turn to the distal end of a piston rod 118 of an air cylinder 120 mounted on support plate 72. The piston rod 118 extends through an aperture 122 in the support plate. Activation of the air cylinder 118 pivots connecting arm 104 around shaft 80 to engage and disengage the rear upper roller with the upper sheet of the plastic film.

A second air cylinder 122 is mounted on support plate 52 and includes a piston rod 124 depending therefrom and extending through an aperture 126 in the support plate. A connecting rod 128 is connected at one end thereof to piston rod 124 and at the other end thereof to a horizontally extending support platform 130.

A roller mounting bar 132 is connected to support platform 130 by a pair of flanges 134. A pair of roller mounting shafts, 136 and 138 are mounted to mounting bar 132. A front lower roller 140 is rotatably mounted on shaft 136 and a rear lower roller 142 is rotatably mounted on shaft 138. The far end of mounting bar 132 is pivotally connected to L-shaped member 76 by a bolt 143. Thus roller mounting bar 132 pivots around bolt 143 with the actuation and deactuation of air cylinder 122. The several rollers are mounted such that when both air cylinders are actuated front lower roller 140 is in spaced relationship with front upper roller 94 and rear lower roller 142 is in spaced relationship with rear upper roller 108, the upper and lower rollers being separated only by the sheets of thermoplastic film.

As stated hereinabove, the sheets 27 and 31 of the thermoplastic film are fed through a guide 37 on each side of the apparatus where they are in engagement with each other. The guides 37 comprise an upper guide member 144 secured to L-shaped member 76 by bolts 146 and support platform 130, which serves as a lower guide member.

The upper guide member 144 includes slots 148 and 150 therein to allow the upper rollers 94 and 108 access to the sheet of thermoplastic film. In a like manner, platform 130 is provided with a pair of slots, 152 and 154 to permit access of the sheets of plastic film for the lower rollers 140 and 142. When the air cylinders 120 and 122 are activated, upper roller 108 as well as upper roller 94 engages the sheet of plastic film 27 and lower rollers 140 and 142 engage the sheet of plastic film 31, with the sheets being pressed between front rollers 94 and 140 and rear rollers 108 and 142.

The dimensions and positioning of these elements are selected such that substantial pressure is exerted by the rollers on the films and on each other. The pressure of the driven upper rollers is sufficient to counterrotate the lower rollers in response thereto and thus drive the plastic films through the work area. The forward rollers are driven such that the linear velocity imparted to the films is slightly greater than that imparted by conveyor means 24. This results in additional longitudinal tension and pressure being placed on the films and adds control to the driving of the films through the apparatus. And, since sprocket 98 is smaller than sprocket 96, roller 108 is driven faster than roller 94 by chain 115 and additional longitudinal tension is placed on the film at roller 108. This additional tension precludes rippling of the film between the two sets of rollers.

The rear upper roller 108 and rear lower roller 142 on each side of the work area are mounted at an angle to the rest of the side-sealing combination due to a bend 156 in connecting arm 104 and an angular surface (not shown) provided in mounting bar 132. This angle is the same amplitude but different polarity as that at which the side-sealing combination is mounted to the sleeve members such that the second pairs of rollers are mounted parallel to the direction of movement of the conveyors. The first pairs of rollers, however, are mounted at a diverging angle to the direction of movement of the conveyors, due to their mounting parallel to the support members depending from the angularly mounted support plates 72. This results in an outward lateral tension being placed on the sheets of thermoplastic film to preclude rippling in the film, add control thereto and increase the pressure thereon for a better application of heat thereto. This angle is preferably 5° for the grade and thickness of polyethylene film used in the packaging of baked goods, but would vary with the kind and thickness of the film used from less than 1° to about 15°.

Heat is applied to films 27 and 31 to fuse them together by rear upper roller 108. The rear lower roller 142 acts as an anvil for the heat and pressure being applied to the films as they are driven by the rotation of the four rollers. The rear upper roller 108 is made of aluminum for good heat conduction, with the rim thereof being covered with Teflon to resist the sticking thereto of molten plastic. The rear lower roller 142 is preferably made of rubber on a like resilient material to increase the pressure applied to the sheets of thermoplastic film pressed therebetween. The character of the rims of the pairs of rollers may be varied as desired to include lateral ridges or a double wheel effect, such as that shown in the drawings on idler 108, etc., without departing from the spirit and scope of the invention.

Figure 4:
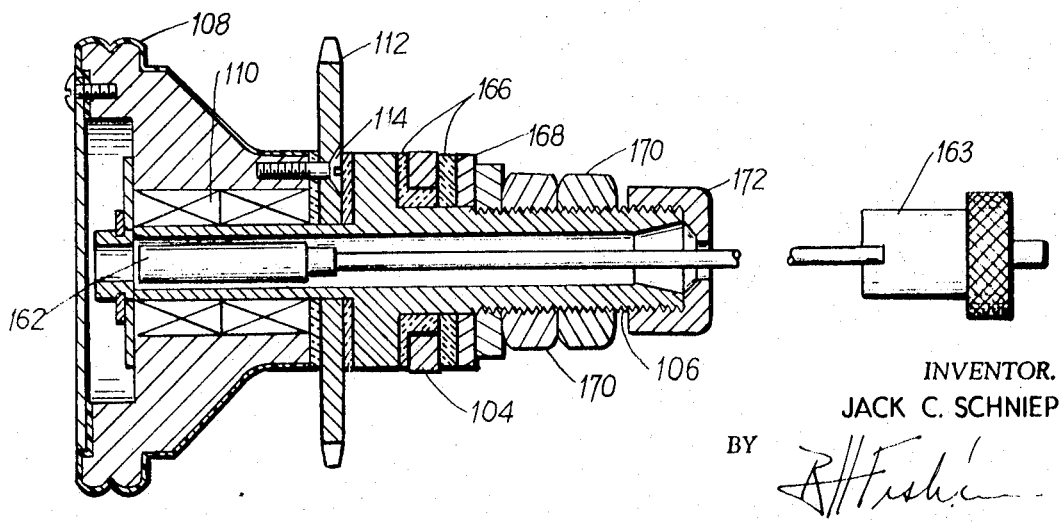
FIG. 4 is an enlarged view of a portion of the sealing apparatus shown in Fig. 2.
Figure 5:
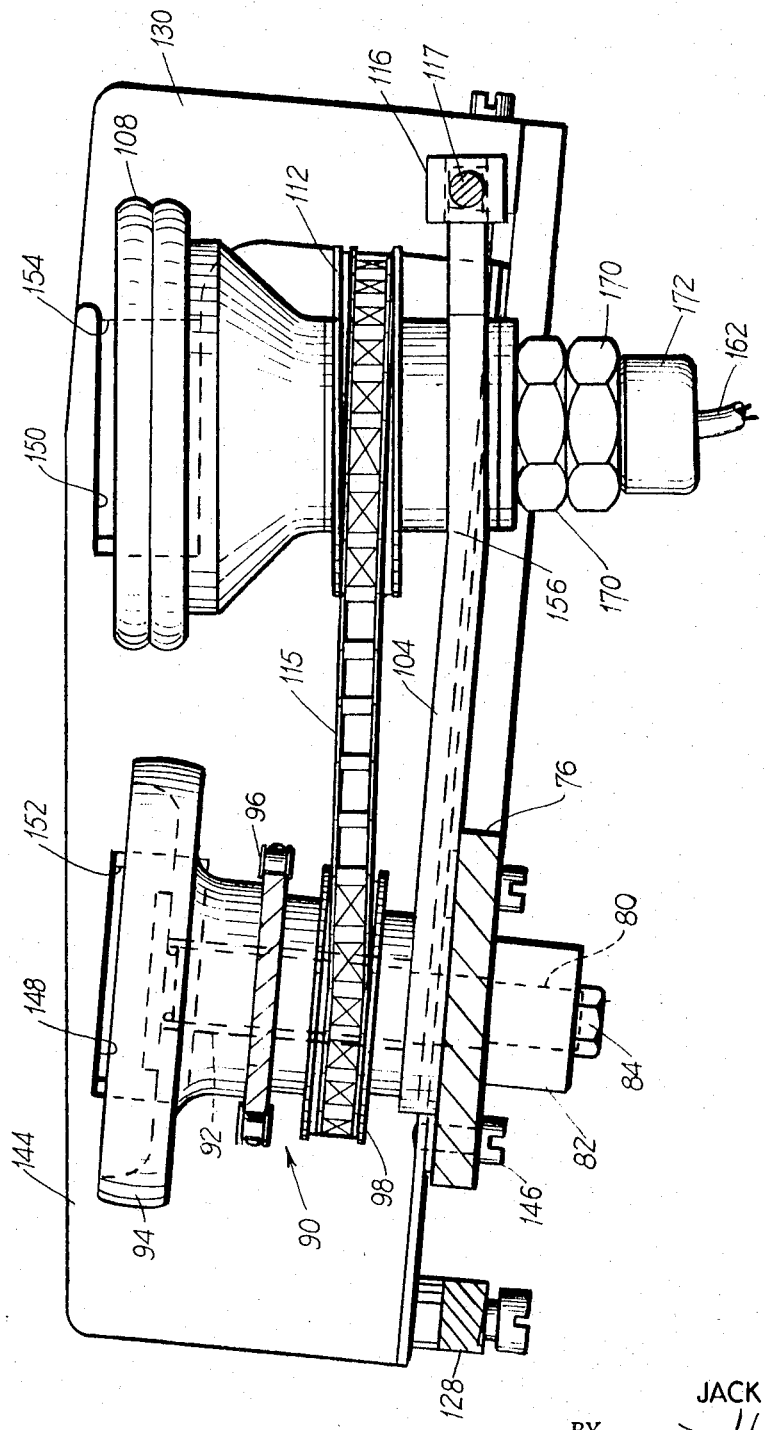
FIG. 5 is a sectional plan view taken along line 5—5 of Fig. 4.
Figure 6:
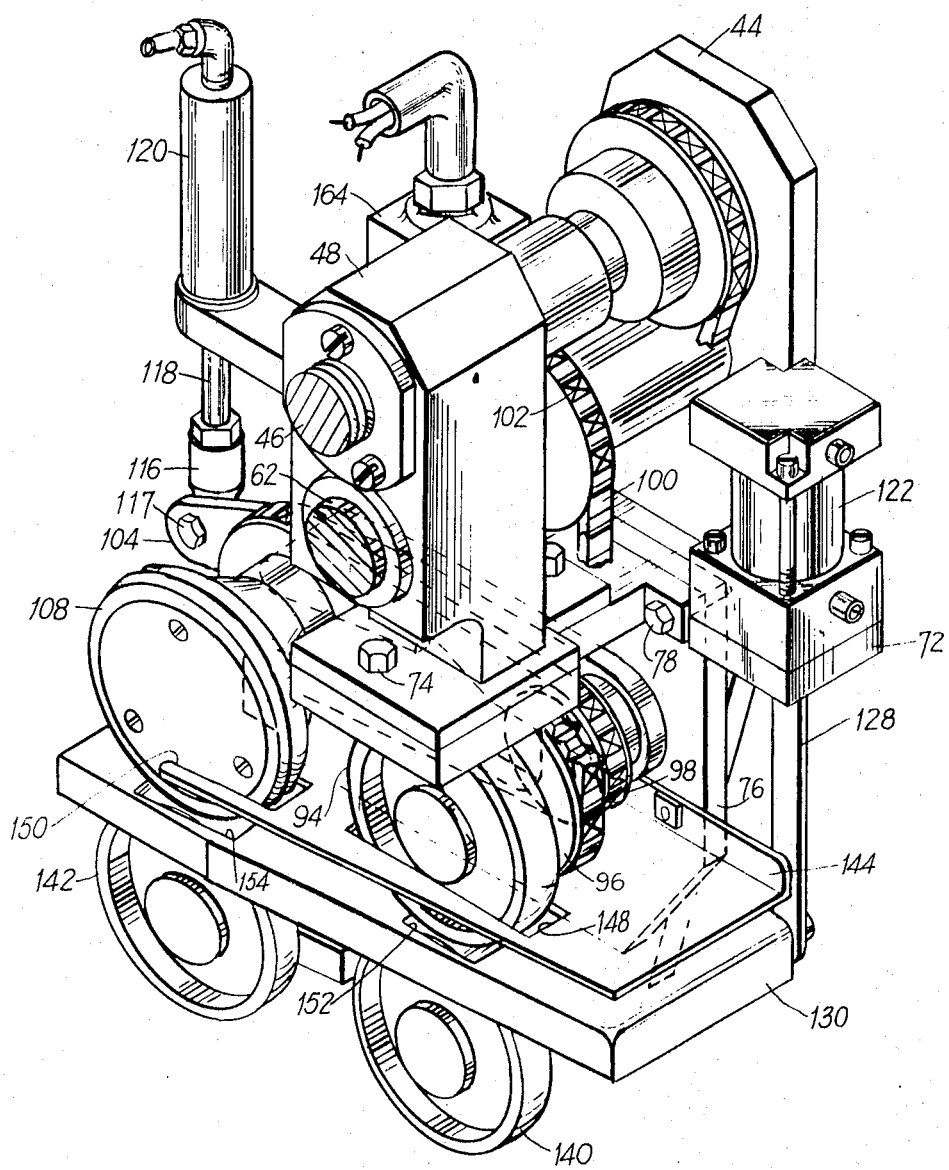
FIG. 6 is an isometric view of a portion of the instant apparatus.

Referring particularly to Fig. 4, heat is applied to the roller 108 through by a heating element 158 mounted in a passageway 160 through shaft 106. An electric lead wire 162 is mounted in the passageway and connects to a plug 163 which connects to a power source 164 mounted on support plate 72. A pair of insulating collars 166 are mounted on shaft 106 as are a spacer 168, a pair of locknuts 170 and a cap 172.

Referring again to Fig. 1, each of the four conveyors comprise spaced roller shafts having a conveyor 10 comprises spaced rollers 180 and 182 mounted on shafts 184 and 186, respectively and a belt 187 mounted over rollers 180 and 182, second conveyor 18 comprises spaced sprockets 188 and 190 mounted on shafts 192 and 194 respectively and plurality of chain 195 mounted over rollers 188 and 190, and outfeed conveyor 40 comprises spaced rollers 196 and 198 mounted on shafts 200 and 202 respectively and a belt 203 mounted over rollers 196 and 198. Conveyor means 24 includes the spaced rollers 51 mounted on shafts 204 and 206 respectively. The two feed rollers 26 are mounted on stub shafts 208 and 210 and the two reed rollers 30 are mounted on stub shafts 212 and 214.

The apparatus is driven by a motor 216 through a gear reduction device 218 having an output shaft 220. A sprocket 222 is mounted on the output shaft 220 and drives a chain 224 that engages therewith. Chain 224 also passes around a sprocket 226 mounted on shaft 186 at first conveyor 10, a sprocket 228 mounted on conveyor means 24 drives shaft 204 and a sprocket 230 mounted on film feed roller shaft 212. The second conveyor 18 is driven from the first conveyor 10 by a chain 232 mounted over a sprocket 234 mounted on first conveyor shaft 186 and a sprocket 236 mounted on second conveyor shaft 192. Outfeed conveyor 40 is driven from conveyor means 24 by a chain 238 mounted over a sprocket 240 mounted on outfeed conveyor shaft 200 and a sprocket 242 mounted on shaft 206 of conveyor means 24.

A chain 224 is mounted around a sprocket 246 on one of the feed rollers stub shaft 212, a sprocket 248 mounted on feed rollers stub shaft 210, a sprocket 250 on feed roller stub shaft 214 and a sprocket 252 mounted on a gear shaft 254.

Gear shaft 254 is mounted in a gear housing 256, which also includes a gear 257 mounted on gear shaft 254, another gear 258 mounted on a gear shaft 260 and meshing with gear 254 and a sprocket 262 mounted on shaft 260. A chain 264 is mounted over sprocket 262 and over a sprocket 266 mounted on a shaft 268 mounted on turn in a channel 270 connected to the machine frame. Another sprocket (not shown) is mounted on shaft 268 and a chain 68 is mounted thereover and over sprocket 70 mounted on shaft 62. A channel 274 is connected to channel 270 and extends upwardly to shaft 62 to shield chain 272.

The apparatus operates as set forth hereinabove, with the advance of the film through the work area being controlled by a timing circuit operably connected to the clutch and brake mechanism mounted to the feed rollers 26 and 30 and the sensing devices 14 and 20. The feed rollers will not operate until sensing device 20 detects an article at the entrance to the work area and will continue to feed until a time predetermined by and preset for the size of the article elapses. Sensing device 14 and gate 12 assure the proper spacing of articles.

The side sealers according to the invention provide a more effective and reliable seal to the sides of the package since the instant idler arrangement results in a positive feed and control on the film as it passes through the work area, while providing far more pressure to the heated area than in prior art arrangements. The instant arrangement also results in a positive tensioning on the film in the longitudinal and lateral direction to increase the pressure brought to bear thereon and to maintain the film in a nonwrinkled condition.

Having now fully set forth both structure and operation of preferred embodiments of the concept underlying the present invention, it may be that various other embodiments as well as certain variations and modifications of the embodiment herein shown and described will occur to those skilled in the art upon becoming familiar with said underlying concept all such embodiments, variations, and modifications as in corporate the spirit of the invention and depend upon its underlying concept are consequently to be considered as within the scope of the claims appended herebelow, unless the claims by their language expressly state otherwise.

I claim:

1. In a machine for packaging articles between sheets of thermoplastic film, apparatus for sealing the sides of the package which comprises:
    guide means mounted at each side of said machine for supporting a plurality of sheets of thermoplastic film,
    a first pair of rollers mounted adjacent each of said guide means for receiving said sheets of thermoplastic film therebetween,
    means for rotating said first pairs of rollers to advance said sheets of thermoplastic film through the guide invention, said first pairs of rollers being mounted at a diverging angle for providing an outward lateral tension and a longitudinal tension on said sheets of film, a second pair of rollers mounted adjacent each of said guide means downstream of said first pair of rollers for receiving said sheets of thermoplastic film therebetween, 2. Apparatus according to claim 11, wherein said diverging angle defined by the two second pairs of rollers is between 5° and 10°.

3. Apparatus according to claim 1, wherein said mean means for rotating said second pair of rollers includes a sprocket or the like mounted on one of said first pair of rollers, a sprocket or the like mounted on one of said second pair of rollers and a chain or the like mounted over the two sprockets.

4. Apparatus according to claim 1, wherein the guide means and the first and second pairs of rollers on each side of the packaging machine are movable toward and away from each other to seal the sides of packages of different widths.

* * * * *

UNITED STATES PATENT OFFICE
CERTIFICATE OF CORRECTION

Patent No. 3,625,802           Dated December 7, 1971

Inventor(s) Jack C. Schniepp

It is certified that error appears in the above-identified patent and that said Letters Patent are hereby corrected as shown below:

On the cover sheet [73] the name of the assignee should read -- AMF INCORPORATED, a corporation of New Jersey --. Column 6, line 25, "invention" should read -- means --; line 32, "11" should read -- 1 --.

Signed and sealed this 7th day of November 1972.

(SEAL)
Attest:

EDWARD M. FLETCHER, JR.
Attesting Officer

ROBERT GOTTSCHALK
Commissioner of Patents